J. R. Taylor.
Boat Detaching.
No. 60,964. Patented Jan. 1, 1867.
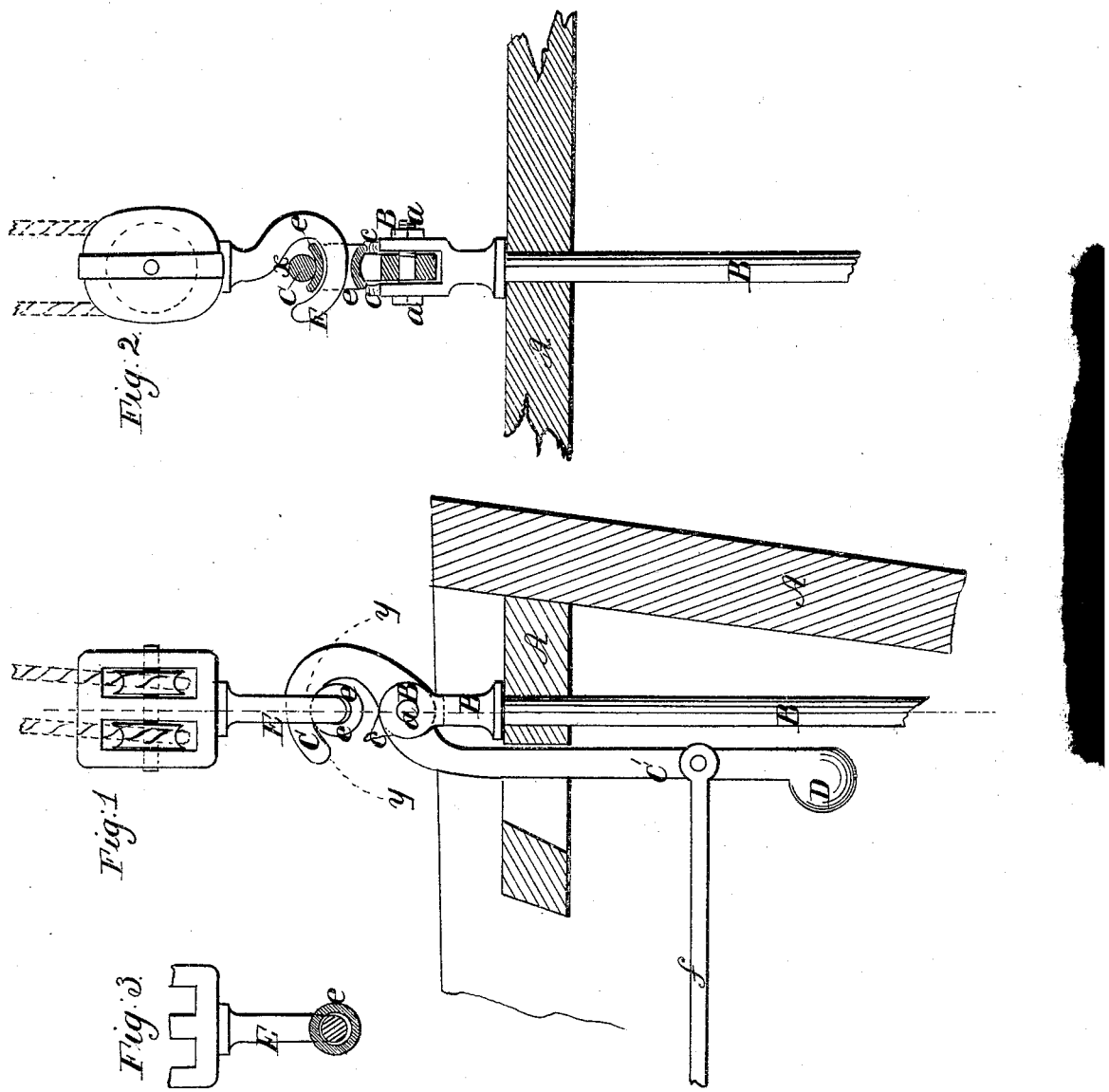

United States Patent Office.

JAMES R. TAYLOR, OF NEW YORK, N. Y.

Letters Patent No. 60,964, dated January 1, 1867.

IMPROVED BOAT-DETACHING TACKLE.

The Schedule referred to in these Letters Patent and making part of the same.

TO ALL WHOM IT MAY CONCERN:

Be it known that I, JAMES R. TAYLOR, of the city, county, and State of New York, have invented certain new and useful improvements in Apparatus for Detaching Life-Boats; and I do hereby declare the following to be a full, clear, and exact description of the same, reference being had to the accompanying drawings, making a part of this specification, in which—

Figure 1 represents a side view of the apparatus.

Figure 2 represents a front view thereof.

Figure 3 represents a section through the hook at the red dotted line $x$, in fig. 2.

Similar letters of reference, where they occur in the separate figures, denote like parts in all the drawings.

This invention relates to a detaching apparatus, composed mainly of two hooks, one of which is unyielding, but furnished with a friction-sleeve or roller, and the other a yielding or pivoted hook, which, in its vertical position, cannot detach from its mate or fellow, but which, when swung out of its vertical position, becomes self-detaching.

To enable others skilled in the art to make and use my invention, I will proceed to describe the same with reference to the drawings.

The sectional-lined portions A represent parts of a boat, to which the detaching apparatus may be connected. B is the holding-head, firmly attached to the boat, and C is a hook, pivoted to the head at $a$. The tail C', of the hook C, extends downward and terminates in a ball or weight, D, though the weight may be in the lever itself. Upon the head B are projecting lugs or ears, $c$, which, when the hook C is in the position shown in the drawings, so close up the space between the point of the hook and the said ears or lugs, that the block-hook E, with its friction-roll or sleeve, $e$, upon it, cannot pass through said space, and, consequently, they cannot, in this position, disconnect. But when the lever C' is raised up, the hook swings back, as shown by the dotted line $y\ y$, whilst the lugs $c$ remain stationary, and this so opens up the space that the hook E readily detaches itself, the friction-roller $e$ taking off or preventing all liability of the hooks clinging to each other. To the lever C' is attached a rod, $f$, which extends to any suitable position, where it can be operated to disconnect the hooks; and this rod or line may connect with a similar apparatus in the opposite end of the boat, so that both may be let go at once.

Having thus fully described my invention, what I claim therein as new, and desire to secure by Letters Patent, is—

The combination of the hook and lever or weight, pivoted to the holding-head, and the block-hook and its roller with the lugs on the holding-head, for the purpose of closing the space between the point of the hook C and the holding-head, and for opening said space by swinging back said hook C, substantially as described.

JAMES R. TAYLOR.

Witnesses:
A. B. STOUGHTON.
EDM. F. BROWN.